United States Patent [19]

Sadler

[11] Patent Number: 4,578,611
[45] Date of Patent: Mar. 25, 1986

[54] PIEZOELECTRIC STRESS WAVE TRANSDUCER WITH BORON NITRIDE PIEZO SUPPORT

[75] Inventor: Michael Sadler, Burton-on-Trent, England

[73] Assignee: Rolls-Royce Limited, London, England

[21] Appl. No.: 692,981

[22] Filed: Jan. 22, 1985

[30] Foreign Application Priority Data

Mar. 14, 1984 [GB] United Kingdom ............... 8406699

[51] Int. Cl.$^4$ ........................................... H01L 41/08
[52] U.S. Cl. .................................. 310/338; 310/327; 310/346
[58] Field of Search ................................ 310/334–338, 310/340, 344, 346, 327; 73/703, 754, 708, 715, 723, DIG. 4; 367/173, 163, 157

[56] References Cited

U.S. PATENT DOCUMENTS

| | | |
|---|---|---|
| 3,461,327 | 8/1969 | Zeiringer ............................ 310/338 |
| 3,857,287 | 12/1974 | Sonderegger .................... 310/338 X |
| 4,196,631 | 4/1980 | Deom et al. ..................... 310/338 X |
| 4,259,606 | 3/1981 | Vig ................................. 310/344 X |

*Primary Examiner*—Mark O. Budd
*Attorney, Agent, or Firm*—Cushman, Darby & Cushman

[57] ABSTRACT

A transducer for detecting stress waves comprises a piezo-electric member which is mounted on a brass backing member and carried by a boron nitride support member. The piezo-electric member is deformed under the influence of stress waves to generate an electrical output, the magnitude of which is indicative of the magnitude of the stress waves.

7 Claims, 1 Drawing Figure

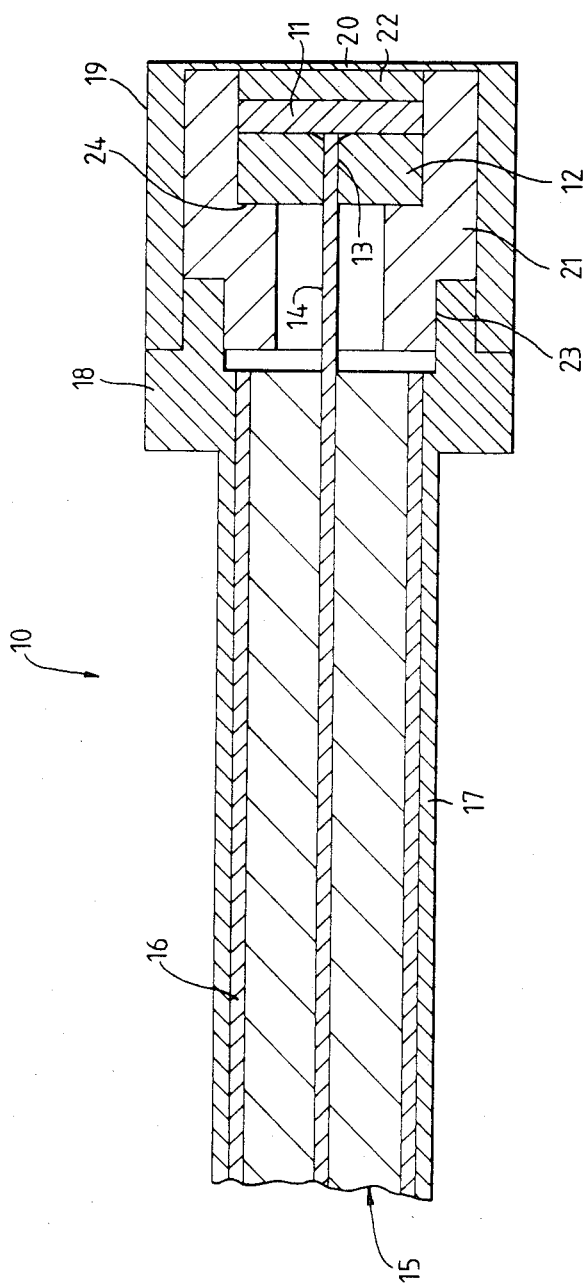

PIEZOELECTRIC STRESS WAVE TRANSDUCER WITH BORON NITRIDE PIEZO SUPPORT

This invention relates to a transducer for detecting stress waves and providing an electrical output which is indicative of the magnitude of such detected stress waves.

In UK Pat. No. 1,116,581 there is described a pressure transducer which includes a piezo-electric crystal mounted in such a manner as to be subject to deformation by the effect thereon by pressure waves. Deformation of the crystal results in the generation of a potential difference across it which is indicative of the magnitude of the pressure waves. Transducers of this type can provide spurious indications of pressure wave magnitude if the crystal is subject to deformation by pressure waves which have already acted upon the crystal but which are subsequently reflected back to the crystal by the other structural components of the transducer. The transducer described in UK Pat. No. 1,116,581 circumvents this problem by the provision of a backing bar on the rear of the piezo-electric crystal. The bar is surrounded by a damping material, such as a silicone rubber, so that any pressure waves which pass through the piezo-electric crystal subsequently pass into the bar and are damped by the damping material, thereby ensuring that no reflected pressure waves reach the crystal.

Whilst transducers of the type described in UK Pat. No. 1,116,581 are effective in indicating the magnitude of pressure waves, limitations are placed on their application in view of their size. They tend to be rather bulky as a result of the size of the damped bar which they contain. A further limitation is one which is dictated by the temperature limitations of the material which is used to damp the bar. Materials which are suitable for damping, such as those sold under the registered Trade Marks "Plasticene" and "Neoprene" are only effective at operating temperatures of up to 150° C. Moreover, such transducers are sensitive to the effects of acceleration and vibration.

It is an object of the present invention to provide a transducer for detecting stress waves which is compact and capable of effective operation at higher temperatures than have heretofore been possible with prior art trasducers of the type described above and which is less sensitive to the effects of vibration and acceleration.

According to the present invention, a trasducer for detecting stress waves comprises a piezo-electric member, an electrically conductive backing member upon which said piezo-electric member is mounted and is in electrical contact therewith, and a boron nitride support member which carries both said piezo-electric member and said backing member, said piezo-electric member being so disposed as to be operationally exposed to stress waves whereby any such stress waves cause said piezo-electrical member to deform and thereby generate an electrical output, the magnitude of which is indicative of the magnitude of said stress waves.

Throughout this specification, the term "stress waves" is to be understood as including both pressure waves travelling in gaseous and liquid media and acoustic emission waves travelling in liquid and solid media.

With reference to the drawing, a stress wave transducer generally indicated at 10 comprises a disc 11 which is made from a piezo-electric lead zirconate titanate crystal and which is cemented by means of an epoxy resin to a brass disc-shaped backing member 12.

Although the disc 11 is made from a lead zirconate titanate crystal in this particular case, it will be appreciated that alternative materials having piezo-electric properties could be used if so desired.

The epoxy resin is applied sparingly between the lead zirconate titanate disc 11 and the brass backing member 12 so as to ensure that it does not prevent the passage of an electrical current between them. This being so, should the lead zirconate titanate disc 11 be deformed and thereby generate an electrical output, that output will be conducted to the brass backing member 12.

The brass backing member is provided with a hole 13 in its centre which receives the central conductor 14 of a coaxial cable 15. The screening element 16 of the coaxial cable 15 is received on the internal surface of a stainless steel tubular member 17 which constitutes the transducer 10 body.

The tubular transducer body 17 is provided at its right hand end (as viewed in the drawing) with an enlarged diameter portion 18 which is flanged so as to receive a metallic end cap 19. The cap 19 has a front face 20 which is thinner than the remainder thereof so that it constitutes a diaphragm across one end of the transducer 10. The cap 19 encloses a hollow cylindrical boron nitride support member 21 which is externally stepped at 23 so as to facilitate its location on the flanged transducer end portion 18 and internally stepped at 24 to provide a location feature for the brass backing member 12 and lead zirconate titanate disc 11 which are located within it. The boron nitride support member 21 additionally carries a platinum coated silica disc 22 which is interposed between the diaphragm 20 and lead zirconate titanate disc 11.

The diaphragm 20 and the platinum coated silica disc 22 serve to protect the lead zirconate titanate disc 11 from damage in the event that the trasducer 10 is required to function in an environment which is likely to have a detrimental effect upon the disc 11. However they are acceptably transparent to stress waves so that in the event of the transducer 10 being exposed to stress waves, the lead zirconate titanate crystal will, if the waves are of sufficient magnitude, be deformed by them and thereby generate a potential difference. The generated potential difference is related to the degree of deformation of the lead zirconate titanate disc 11 and hence the magnitude of the stress waves to which it is exposed. Thus the lead zirconate titanate disc 11 provides an electrical output, the magnitude of which is indicative of the magnitude of the stress waves.

The electrical output of the lead zirconate titanate disc 11 is passed via the brass backing disc 12 to the central conductor 14 of the coaxial cable 15. The conductor 14 is connected to a conventional amplifier (not shown) which is capable of providing a suitable output in the event of stress waves which are at either a constant level of magnitude of fluctuating levels of magnitude being encountered by the transducer 10. The amplifier output is used to drive suitable means for indicating the magnitude of the detected stress waves.

Although this particular embodiment of the present invention has been described with reference to a transducer 10 which is provided with a diaphragm 20 and platinum coated silica disc 11 in order to protect the lead zirconate titanate disc 11, it will be appreciated that in certain operating environments such precautions may well be unnecessary. It is anticipated therefore that in such circumstances, the diaphragm 20 and platinum coated silica disc may be dispensed with. For instance, if the transducer 10 were to be used in an environment in which the stress waves which it is intended to detect were constituted by changes in pressure of a gas or liquid which is at high temperature and corrosive then the diaphragm 20 would provide corrosion protection and the platinum coated silica disc 22 thermal protection of the lead zirconate titanate disc 11. However, if the transducer 10 were to be used for the detection of stress waves which are in the form of acoustic emissions within a solid body, then the diaphragm 20 and the platinum coated silica disc 22 could possibly be dispensed with and the lead zirconate titanate disc 12 placed in contact with or immediately adjacent to the body under examination. Alternatively the silica disc 22 could be placed on the external face of the diaphragm 20 so that it functions as a wear shoe to protect the diaphragm 20 if the transducer 10 is placed in direct contact with a hard surface.

The boron nitride support member 21 serves a dual function. Firstly it serves as thermally insulating support member for the lead zirconate titanate disc 11 so that the transducer 10 may be capable of operation in hot environments without the operation of the lead zirconate titanate disc 11 being adversely affected. Indeed in tests which have been carried out on the effect of temperature on the operation of the transducer 10, we have found that at temperatures from 0° C. to 250° C., it was effective in detecting stress waves within the frequency range 35Hz to 2MHz.

The second function of the boron nitride support member 21 is to absorb stress waves after they have passed through the lead zirconate titanate disc 11 and the brass backing disc 12. If such absorption is not achieved reflected stress waves would pass back through the lead zirconate titanate disc 11 and thereby cause resonance within it, leading in turn to spurious signals from the transducer 10. We have found during trails of the transducer 10 that over the stress wave frequency range 35Hz to 2MHz there is no significant resonance within the lead zirconate titanate disc 11.

It will be seen therefore that the transducer 10 is capable of operating at higher temperatures than known transducers which rely on damped bars for the elimination of resonance and is additionally of more compact dimensions than such transducers. Indeed we have found that it is possible to manufacture transducers of the type illustrated at 10 which have a overall size of 2.5 mm diameter and 8 mm length. Moreover since the transducer 10 is of compact dimensions and does not rely upon non-rigid damping materials it is less prone to the effects of acceleration and vibration than the prior art transducers described above.

I claim:

1. A transducer for detecting stress waves comprising a piezo-electric member, an electrically conductive backing member upon which said piezo-electric member is mounted and which is in electrical contact therewith and a boron nitride support member which carries both said piezo-electric member and said backing member, said piezo-electric member being so disposed as to be operationally exposed to stress waves whereby any such stress waves cause said piezo-electric to deform and thereby generate an electrical output, the magnitude of which is indicative of the magnitude of said stress waves.

2. A transducer as claimed in claim 1 wherein said transducer is provided with a protective barrier which barrier is interposed between said piezo-electric member and the source of said any such stress waves, said barrier being substantially transparent to said any such stress waves.

3. A transducer as claimed in claim 2 wherein said protective barrier comprises a silica element provided with a metallic coating.

4. A transducer as claimed in claim 3 wherein said protective barrier additionally comprises a metallic diaphragm.

5. A transducer as claimed in claim 3 wherein said piezo-electric member and said metal coated silica element are disc-shaped, and said boron nitride support member is generally in the shape of a hollow cylinder, said piezo-electric member and said metal coated silicon element being enclosed within said boron nitride support member in coaxial relationship therewith.

6. A transducer as claimed in claim 1 wherein said piezo-electric member is in the form of a lead zirconate titanate crystal.

7. A transducer as claimed in claim 1 wherein said electrically conductive backing member is made from brass.

* * * * *